US010965658B2

(12) United States Patent
Stuntebeck

(10) Patent No.: US 10,965,658 B2
(45) Date of Patent: *Mar. 30, 2021

(54) APPLICATION PROGRAM AS KEY FOR AUTHORIZING ACCESS TO RESOURCES

(71) Applicant: AirWatch LLC, Atlanta, GA (US)

(72) Inventor: Erich Stuntebeck, Marietta, GA (US)

(73) Assignee: AirWatch LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/840,579

(22) Filed: Dec. 13, 2017

(65) Prior Publication Data
US 2018/0103028 A1 Apr. 12, 2018

Related U.S. Application Data

(63) Continuation of application No. 14/943,293, filed on Nov. 17, 2015, now Pat. No. 9,847,986, which is a
(Continued)

(51) Int. Cl.
H04L 29/06 (2006.01)
G06F 21/10 (2013.01)
(Continued)

(52) U.S. Cl.
CPC .............. *H04L 63/08* (2013.01); *G06F 21/10* (2013.01); *G06F 21/335* (2013.01);
(Continued)

(58) Field of Classification Search
CPC ..... H04L 63/08; H04L 67/303; H04L 63/105; G06F 21/335; G06F 21/10; G06F 21/6218
See application file for complete search history.

(56) References Cited

U.S. PATENT DOCUMENTS 5,574,786 A 11/1996 Dayan et al.
5,987,609 A 11/1999 Hasebe
(Continued)

FOREIGN PATENT DOCUMENTS

CA 2149337 6/1994
EP 2271140 A1 1/2011
(Continued)

OTHER PUBLICATIONS

Brien Posey, "Prevent unauthorized software on your network with software restriction policies", Retrieved From https://www.techrepublic.com/article/prevent-unauthorized-software-on-your-network-with-software-restriction-policies/, Published Oct. 24, 2002. (Year: 2002).*
(Continued)

*Primary Examiner* — Chau Le
(74) *Attorney, Agent, or Firm* — Thomas | Horstemeyer LLP

(57) ABSTRACT

In a networked environment, a client side application executed on a client device may transmit a request to an authorization service for access to a resource. The authorization service may authenticate the user of client device and/or the client device based on user credentials and/or a device identifier. In response to authenticating the user and/or the client device, the authorization service may send to the client side application a request for confirmation that the client device complies with a distribution rule associated with the resource, where the distribution rule requires a specific application or specific type of application to be installed, enabled and/or executing on the client device as a prerequisite to accessing the resource. If the client device complies with the distribution rule, the client side application accesses the resource. Accessing the resource may include receiving an authorization credential required for access to the resource.

20 Claims, 4 Drawing Sheets

Related U.S. Application Data continuation of application No. 13/842,623, filed on Mar. 15, 2013, now Pat. No. 9,203,820.

(51) Int. Cl.
   *G06F 21/33* (2013.01)
   *G06F 21/62* (2013.01)
   *H04L 29/08* (2006.01)

(52) U.S. Cl.
   CPC ........ *G06F 21/6218* (2013.01); *H04L 63/105* (2013.01); *H04L 67/303* (2013.01)

(56) References Cited

U.S. PATENT DOCUMENTS

| | | | |
|---|---|---|---|
| 6,021,492 A | 2/2000 | May | |
| 6,023,708 A | 2/2000 | Mendez et al. | |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |
| 6,233,341 B1 | 5/2001 | Riggins | |
| 6,560,772 B1 | 5/2003 | Slinger | |
| 6,708,221 B1 | 3/2004 | Mendez et al. | |
| 6,714,859 B2 | 3/2004 | Jones | |
| 6,726,106 B1 | 4/2004 | Han et al. | |
| 6,727,856 B1 | 4/2004 | Hill | |
| 6,741,232 B1 | 5/2004 | Siedlikowski et al. | |
| 6,741,927 B2 | 5/2004 | Jones | |
| 6,766,454 B1 * | 7/2004 | Riggins | H04L 63/0838 713/185 |
| 6,779,118 B1 | 8/2004 | Ikudome et al. | |
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasiu | |
| 7,039,394 B2 | 5/2006 | Bhaskaran | |
| 7,039,679 B2 | 5/2006 | Mendez et al. | |
| 7,064,688 B2 | 6/2006 | Collins et al. | |
| 7,092,943 B2 | 8/2006 | Roese et al. | |
| 7,184,801 B2 | 2/2007 | Farcasiu | |
| 7,191,058 B2 | 3/2007 | Laird et al. | |
| 7,203,959 B2 | 4/2007 | Nachenberg et al. | |
| 7,225,231 B2 | 5/2007 | Mendez et al. | |
| 7,228,383 B2 | 6/2007 | Friedman et al. | |
| 7,275,073 B2 | 9/2007 | Ganji et al. | |
| 7,284,045 B1 | 10/2007 | Marl et al. | |
| 7,287,271 B1 | 10/2007 | Riggins | |
| 7,308,703 B2 | 12/2007 | Wright et al. | |
| 7,310,535 B1 | 12/2007 | MacKenzie et al. | |
| 7,353,533 B2 | 4/2008 | Wright et al. | |
| 7,363,349 B2 | 4/2008 | Friedman et al. | |
| 7,363,361 B2 | 4/2008 | Tewari et al. | |
| 7,373,517 B1 | 5/2008 | Riggins | |
| 7,437,752 B2 | 10/2008 | Heard et al. | |
| 7,444,375 B2 | 10/2008 | McConnell et al. | |
| 7,447,506 B1 | 11/2008 | MacKenzie et al. | |
| 7,447,799 B2 | 11/2008 | Kushner | |
| 7,475,152 B2 | 1/2009 | Chan et al. | |
| 7,496,957 B2 | 2/2009 | Howard et al. | |
| 7,539,665 B2 | 5/2009 | Mendez | |
| 7,565,314 B2 | 7/2009 | Borgeson et al. | |
| 7,590,403 B1 | 9/2009 | House et al. | |
| 7,594,224 B2 | 9/2009 | Patrick et al. | |
| 7,603,547 B2 | 10/2009 | Patrick et al. | |
| 7,603,548 B2 | 10/2009 | Patrick et al. | |
| 7,603,703 B2 | 10/2009 | Craft et al. | |
| 7,617,222 B2 | 11/2009 | Coulthard et al. | |
| 7,620,001 B2 | 11/2009 | Ganji | |
| 7,620,392 B1 | 11/2009 | Maurya et al. | |
| 7,650,491 B2 | 1/2010 | Craft et al. | |
| 7,660,902 B2 | 2/2010 | Graham et al. | |
| 7,665,118 B2 | 2/2010 | Mann et al. | |
| 7,665,125 B2 | 2/2010 | Heard et al. | |
| 7,685,645 B2 | 3/2010 | Doyle et al. | |
| 7,702,322 B1 | 4/2010 | Maurya et al. | |
| 7,702,785 B2 | 4/2010 | Bruton, III et al. | |
| 7,735,122 B1 | 6/2010 | Johnson et al. | |
| 7,739,334 B1 | 6/2010 | Ng et al. | |
| 7,752,166 B2 | 7/2010 | Quinlan et al. | |
| 7,788,382 B1 | 8/2010 | Jones et al. | |
| 7,792,297 B1 | 9/2010 | Piccionelli et al. | |
| 7,840,631 B2 | 11/2010 | Farcasiu | |
| 7,890,091 B2 | 2/2011 | Puskoor et al. | |
| 7,890,756 B2 | 2/2011 | Zlotnick | |
| 7,912,896 B2 | 3/2011 | Wolovitz et al. | |
| 7,917,641 B2 | 3/2011 | Crampton | |
| 7,970,386 B2 | 6/2011 | Bhat et al. | |
| 8,001,082 B1 | 8/2011 | Muratov | |
| 8,012,219 B2 | 9/2011 | Mendez et al. | |
| 8,041,776 B2 | 10/2011 | Friedman et al. | |
| 8,045,709 B2 * | 10/2011 | Park | H04L 63/06 380/201 |
| 8,046,823 B1 | 10/2011 | Begen et al. | |
| 8,060,074 B2 | 11/2011 | Danford et al. | |
| 8,069,144 B2 | 11/2011 | Quinlan et al. | |
| 8,078,157 B2 | 12/2011 | Maurya et al. | |
| 8,094,591 B1 | 1/2012 | Hunter et al. | |
| 8,117,344 B2 | 2/2012 | Mendez et al. | |
| 8,150,431 B2 | 4/2012 | Wolovitz et al. | |
| 8,225,381 B2 | 7/2012 | Lemke | |
| 9,667,426 B2 * | 5/2017 | Sekiya | G06F 21/72 |
| 2002/0013721 A1 | 1/2002 | Dabbiere et al. | |
| 2003/0110084 A1 | 6/2003 | Eberhard et al. | |
| 2003/0204716 A1 | 10/2003 | Rockwood et al. | |
| 2003/0208562 A1 * | 11/2003 | Hauck | H04L 63/08 709/219 |
| 2004/0123153 A1 | 6/2004 | Wright et al. | |
| 2004/0181687 A1 | 9/2004 | Nachenberg et al. | |
| 2004/0224703 A1 | 11/2004 | Takaki et al. | |
| 2005/0097327 A1 * | 5/2005 | Ondet | G06Q 20/02 713/171 |
| 2005/0246192 A1 | 11/2005 | Jauffred et al. | |
| 2006/0053080 A1 * | 3/2006 | Edmonson | G06F 21/10 705/59 |
| 2006/0190984 A1 | 8/2006 | Heard et al. | |
| 2007/0006321 A1 * | 1/2007 | Bantz | G06F 21/6218 726/27 |
| 2007/0033397 A1 | 2/2007 | Phillips, II et al. | |
| 2007/0136492 A1 | 6/2007 | Blum | |
| 2007/0156897 A1 | 7/2007 | Lim | |
| 2007/0174433 A1 | 7/2007 | Mendez et al. | |
| 2007/0220594 A1 * | 9/2007 | Tulsyan | G06F 21/31 726/5 |
| 2007/0261099 A1 | 11/2007 | Broussard et al. | |
| 2007/0288637 A1 | 12/2007 | Layton et al. | |
| 2008/0133712 A1 | 6/2008 | Friedman et al. | |
| 2008/0134305 A1 | 6/2008 | Hinton et al. | |
| 2008/0134347 A1 | 6/2008 | Goyal et al. | |
| 2008/0201453 A1 | 8/2008 | Assenmacher | |
| 2009/0036111 A1 | 2/2009 | Danford et al. | |
| 2009/0055918 A1 * | 2/2009 | Chang | G06F 21/57 726/10 |
| 2009/0144632 A1 | 6/2009 | Mendez | |
| 2009/0198997 A1 | 8/2009 | Yeap et al. | |
| 2009/0260064 A1 | 10/2009 | McDowell et al. | |
| 2009/0300739 A1 | 12/2009 | Nice et al. | |
| 2009/0307362 A1 | 12/2009 | Mendez et al. | |
| 2010/0005125 A1 | 1/2010 | Mendez et al. | |
| 2010/0005157 A1 | 1/2010 | Mendez et al. | |
| 2010/0005195 A1 | 1/2010 | Mendez et al. | |
| 2010/0023630 A1 | 1/2010 | Mendez et al. | |
| 2010/0100641 A1 | 4/2010 | Quinlan et al. | |
| 2010/0120450 A1 | 5/2010 | Herz | |
| 2010/0144323 A1 | 6/2010 | Collins et al. | |
| 2010/0146269 A1 | 6/2010 | Baskaran | |
| 2010/0254410 A1 | 10/2010 | Collins | |
| 2010/0268844 A1 | 10/2010 | Quinlan et al. | |
| 2010/0273456 A1 | 10/2010 | Wolovitz et al. | |
| 2010/0299152 A1 | 11/2010 | Batchu et al. | |
| 2010/0299362 A1 | 11/2010 | Osmond | |
| 2010/0299376 A1 | 11/2010 | Batchu et al. | |
| 2010/0299719 A1 | 11/2010 | Burks et al. | |
| 2011/0004941 A1 | 1/2011 | Mendez et al. | |

(56) References Cited

U.S. PATENT DOCUMENTS

| | | |
|---|---|---|
| 2011/0082900 A1 | 4/2011 | Nagpal et al. |
| 2011/0113062 A1 | 5/2011 | Quinlan et al. |
| 2011/0145932 A1 | 6/2011 | Merger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0144202 A1* | 6/2012 | Counterman ......... G06F 21/335 713/176 |
| 2012/0198547 A1 | 8/2012 | Fredette et al. |
| 2013/0042230 A1* | 2/2013 | Little ................. G06F 8/65 717/173 |
| 2013/0061307 A1 | 3/2013 | Livne |
| 2013/0152169 A1 | 6/2013 | Stuntebeck |
| 2013/0176594 A1* | 7/2013 | Tanaka ................. H04N 1/04 358/1.15 |
| 2014/0123240 A1* | 5/2014 | Seo .................. H04L 63/0807 726/4 |
| 2014/0282895 A1* | 9/2014 | Stuntebeck ............ G06F 21/34 726/4 |
| 2014/0282897 A1* | 9/2014 | Stuntebeck ............ H04L 63/08 726/4 |

FOREIGN PATENT DOCUMENTS

| | | |
|---|---|---|
| GB | 2346716 | 8/2000 |
| WO | 0241661 | 5/2002 |

OTHER PUBLICATIONS

Asynchrony Software, Inc., "PDA Defense User Guide," 276, 2002.
Belani, Eshwar, et al., "The CRISIS Wide Area Security Architecture", 726, 1998.
International Search Report for PCT/US2014/025269 dated Jun. 18, 2014.
Non-final Office Action cited in U.S. Appl. No. 13/316,073 dated Jan. 18, 2013.
Benaloh, Josh et al., "Patient Controlled Encryption: Ensuring Privacy of Electronic Medical Records", 726, 11! 13/2009.
Fox, Armando et al., "Security on the Move: Indirect Authentication Using Kerberos", 726, 1996.
Menaria, Pankaj et al., "Security in Mobile Database Systems", 707,726,Mar. 17, 2011.
Pfitzmann, Andreas et al., "Mobile User Devices and Security Modules: Design for Trustworthiness", 726, Feb. 5, 1996.
Steiner, Jennifer, "Kerberos: An Authentication Service for Open Network Systems", 726, Jan. 12, 1988.
Strunk, John et al., "Self-Securing Storage: Protecting Data in Compromised Systems", Symposium on Operating Systems Design and Implementation, 726, 2000.
Patent Examination Report dated May 23, 2016 for Application No. 2014235165 (IP Australia).
Office Action mailed for Application No. 14 716 156.6-1213.
Examination Report mailed for Application No. 14/716,156.6-1213.

* cited by examiner

APPLICATION PROGRAM AS KEY FOR AUTHORIZING ACCESS TO RESOURCES

CROSS-REFERENCE TO RELATED APPLICATION

This application is a continuation of and claims the benefit of U.S. patent application Ser. No. 13/842,623 entitled "APPLICATION PROGRAM AS KEY FOR AUTHORIZING ACCESS TO RESOURCES," filed Mar. 25, 2013. This application is a continuation of and claims the benefit of U.S. patent application Ser. No. 14/943,293 entitled "APPLICATION PROGRAM AS KEY FOR AUTHORIZING ACCESS TO RESOURCES," filed Nov. 17, 2015. Both of the above applications are hereby incorporated by reference herein in their entireties.

BACKGROUND

Managing access to enterprise resources by network-connected devices is critical to ensure that only authenticated and authorized users and devices gain access to sensitive information or services. To date, this has typically been accomplished by utilizing network firewalls, reverse proxy servers with authentication, and encrypted VPN tunnels. Today, however, enterprise resources are being moved out of enterprise-managed data centers and into the "Cloud." These cloud-based network environments may not provide the configurability and customization necessary to sufficiently protect enterprise resources. For instance, protecting enterprise-managed data centers at a device level can be problematic. Cloud-based data services often do not provide the necessary features to allow enterprises to manage access to the services at a device level.

SUMMARY OF THE INVENTION

The disclosed embodiments relate to a system and associated devices and methods for managing access to resources in a networked environment. A client side application executed on a client device may transmit a request to an authorization service for access to a resource. The authorization service may first authenticate the user of client device and/or the client device based on at least one of user credentials and a device identifier. Authenticating the user credentials and/or the device identifier may include determining that the user credentials and/or the device identifier is/are associated with the resource. In response to authenticating the user and/or the client device, the authorization service may send to the client side application a request for confirmation that the client device complies with a distribution rule associated with the resource, wherein the distribution rule requires a key application to be installed, enabled and/or executing on the client device as a prerequisite to accessing the resource.

In response to a determination that the client device complies with the distribution rule, the client side application receives authorization to access the resource. The determination that the client device complies with the distribution rule may be performed by the client side application in response to receiving the distribution rule or a key application identifier. Alternatively, the compliance determination may be performed by the authorization service in response to receiving relevant information from the client side application. In response to receiving the authorization, the client side application accesses the resource, which may be stored on an enterprise server or on the client device.

The authorization to access the resource may include an authorization credential required for access to the resource, which may be provided by the authorization service or may be obtained or derived from the key application. In some embodiments, the authorization service provides the authorization credential to a distribution service, which provides the client side application with access to the resource in response to authenticating the authorization credential. The authorization credential may be at least one of a PIN, a key, a certificate, and a token.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

Figure 1:
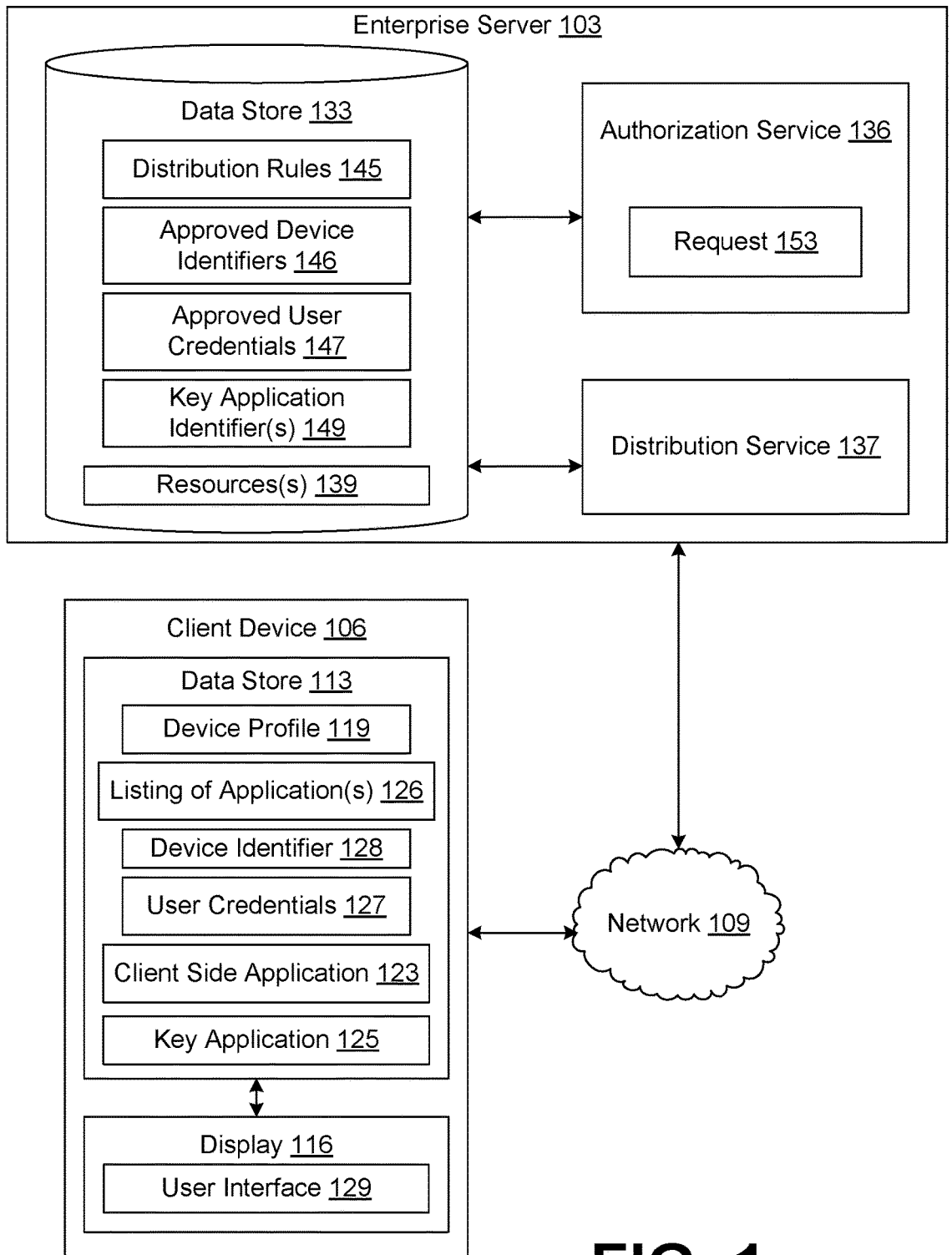
FIG. 1 is a block diagram of a networked environment according to certain embodiments.

Disclosed are various embodiments for a system and associated devices and methods for managing access to resources in a networked environment. In some embodiments, the system comprises an enterprise server and one or more client device(s) configured as described herein. The enterprise server may store or otherwise control access to resources, such as data, databases, application programs and application files, text files, word processor files, spreadsheet files, presentation files, graphic files, audio files, photographic files, video files and/or the like. The enterprise server may execute an authorization service for determining whether to authorize access to resources. The enterprise server may also execute a distribution service for providing resources to the client device(s) or providing the client device(s) with access to resources.

In some embodiments, the authorization service may first attempt to authenticate user credentials associated with the user of the client device and/or a device identifier that uniquely identifies the client device. User credentials may include one or more of a user name and password, biometric data, and/or other data used to identify the user. The device identifier may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally, the device identifier may be represented by a unique software identifier such a token or certificate, based at least in part on the aforementioned unique hardware identifiers.

As an additional security measure, the authorization service may require a specific application program or a type of application program (collectively referred to herein as a "key application") to be installed on and/or executed by the client device before the authorization service authorizes the client device to access the requested resource(s). The determination as to whether the key application is installed on and/or executed by the client device may be performed by the authorization service or locally on the client device, as described herein. This additional security measure may be performed before or after the requested resource(s) are transferred to, downloaded or otherwise accessed by the client device.

In some embodiments, the authorization service may instruct a distribution service (e.g., executed on the enterprise server or another network device) to provide the requested resource(s) or provide access to the requested resource(s) to the compliant client device. In some embodiments, the authorization service may provide to the compliant client device an additional authorization credential, such as a PIN, key, certificate, and/or token, etc., which may be used to access the requested resource(s), or may issue a command to enable a previously disabled function of an application program running on the client device for accessing the requested resource(s). In some embodiments, an authorization credential or command may be provided by the key application to another application executed by the client device, so as to enable the other application to access the requested resource(s).

FIG. 1 illustrates an example of networked environment 100 according to various embodiments. The networked environment 100 includes an enterprise server 103, at least one client device 106 and a network 109. The network 109 may be or include, for example, any type of wireless network such as a wireless local area network (WLAN), a wireless wide area network (WWAN) or any other type of wireless network now known or later developed. Additionally, the network 109 may be or include the Internet, intranets, extranets, microwave networks, satellite communications, cellular systems, PCS, infrared communications, global area networks, or other suitable networks, etc., or any combination of two or more such networks. The network 109 facilitates transmission of communications and resources between one or more client devices 106 and the enterprise server 103.

By way of example, a client device 106 may be a desktop computer, a laptop computer, a personal digital assistant, a cellular telephone, a set-top box, a music player, a web pad, a tablet computer system, a game console, and/or another device with like capability. A client device 106 may include a wired network connectivity component (not shown in FIG. 1), for example, an Ethernet network adapter, a modem, and/or the like. A client device 106 may further include a wireless network connectivity interface (not shown in FIG. 1), for example, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. A client device 106 may thus be operable to communicate via wired connection with the enterprise server 103 with the aid of the wired network connectivity component. A client device 106 may be further operable to communicate wirelessly with the enterprise server 103 with the aid of the wireless network connectivity component.

Additionally, a client device 106 may further comprise a memory for storing data and application programs, a processor for executing application programs and other executable instructions stored in the memory, and a local interface such as a bus, as will be described with respect to FIG. 4. The client device 106 may also include a display 116 for rendering user interfaces and resources. The memory of the client device 106 may contain a data store 113. In certain embodiments, the data store 113 may store certain data and application programs, including a device profile 119, user credentials 127, a device identifier 128, a first application program (referred to herein as a "client side application" 123) and a second application program that serves as the key application 125, and a listing of application programs 126 installed, enabled and/or executing on the client device 106.

The device profile 119 may indicate various hardware, software, and security attributes or other configurations of the client device 106. For instance, the device profile 119 may indicate hardware specifications of the client device 106, version and configuration information of various software programs and hardware components installed, enabled and/or executing on the client device 106, transport protocols enabled on the client device 106, version and usage information of various other resources stored on the client device 106, and/or any other attributes associated with the state of the client device 106. The information included in the device profile 119 and other data stored on or accessible to the client device 106 may be used to verify that the client device 106 complies with one or more distribution rule(s) 145 that may be associated with certain resources 139.

Distribution rules 145 may specify certain hardware, software and other device parameters or configurations with which the client device 106 must comply before it will be authorized to access any resources 139 associated with such distribution rules 145. In some embodiments, a distribution rule 145 associated with a resource 139 may specify that a key application 125 must be installed, enabled and/or executing on the client device 106 before another application, such as the client side application 123, will be authorized to access that resource 139. For example, the resource 139 may not be provided or made accessible to the client side application 123 unless and until compliance with the distribution rule 145 is confirmed. As another example, an authorization credential for access to a protected resource 139 may be provided to the client side application 123 (either from the enterprise server 103 or the key application 125) only after compliance is confirmed.

In some embodiments, the client side application 123 may be executed to transmit to the enterprise server 103 a request 153 for access to at least one resource 139. The client side application 123 may also include functionality for rendering a user interface 129 on the display 116 and for displaying resources 139 therein. In some embodiments, the client side application 123 may render a user interface 129 that presents an array of resources 139 in a single view, such as in a category-based tree or outline format. As will be appreciated, the client side application 123 may also include functionality for receiving and responding to user input commands generated by various input/output devices.

In some embodiments, the client side application 123 may be a secure container program that may be authorized to receive and render selected resources 139. The secure container program may also execute other application programs within its secure environment, where such application programs are stored locally on the client device 106 and/or on the enterprise server 103 or another network device. By way of example, such other applications may include web browsing applications, email applications, instant messaging applications, and/or other applications capable of receiving and/or rendering resources 139 on the display 116.

In some embodiments, where the client side application 123 is not a secure container program, the client side application 123 may be configured with instructions for communicating with and executing commands received from the authorization service 136 for performing the authorization methods described herein. Such instructions may be included in or called by the program code of the client side application 123 or may be provided by a wrapper applied to the client side application 123.

The enterprise server 103 may comprise, for example, a server computer or any other system providing and authorizing access to resources 139. Alternatively, a plurality of enterprise servers 103 may be employed that are arranged, for example, in one or more server banks or computer banks or other arrangements. For example, a plurality of enterprise servers 103 together may comprise a cloud computing resource, a grid computing resource, and/or any other distributed computing arrangement. Such enterprise servers 103 may be located in a single installation or may be distributed among many different geographic locations. For purposes of convenience, the enterprise server 103 is referred to herein in the singular. Even though the enterprise server 103 is referred to in the singular, it is understood that a plurality of enterprise servers 103 may be employed in the arrangements as descried herein.

The enterprise server 103 may execute various application programs, services and other processes. For example the enterprise server 103 may execute the authorization service 136 and a distribution service 137 that distributes resources 139 to client devices 106 or otherwise provides client devices 106 with access to resources 139. It should be understood that in some embodiments, the authorization service 136 may be executed on one or more other network devices, such as a proxy server and/or a compliance server. It should also be understood that, in some embodiments, the functions of and processes performed by the authorization service 136 described herein may be distributed among a plurality of different services, including an authentication service for authenticating user and device credentials and/or a compliance service for determining whether client devices 106 comply with resource distribution rules and other requirements.

Also, certain data may be stored in a data store 133 that is contained in or otherwise accessible to the enterprise server 103. The illustrated data store 133 may be representative of a plurality of data stores, as can be appreciated. The data store 133 may utilize strong encryption standards to protect against unauthorized access. For example, the data store 133 may utilize the Advanced Encryption Standard (AES-256) or Standard Hash Algorithm (SHA-1) or any similar strong encryption standard commonly utilized for server-side data storage.

In some embodiments, the data stored in the data store 133 includes resources 139, a listing of approved device identifiers 146, a listing of approved user credentials 147, a listing of key application identifiers 149 and distribution rules 145. The approved user credentials 147 represents user credentials that have been previously approved for accessing certain resources 139. Similarly, the listing of approved device identifiers 146 represents a listing of device identifiers that have been previously approved for accessing certain resources 139. Accordingly, user credentials 127 and device identifiers 128 received from client devices 106 (i.e., in connection with requests 153 for access to resources 139) are authenticated by comparing them to the listing of approved user credentials 147 and the listing of approved device identifiers 146, respectively. In some embodiments, the data store 133 may store a listing of approved pairings of user credential and device identifiers and the authentication process may involve determining whether the user credentials 127 and the device identifiers 128 received from client device 106 match any of the approved pairings.

The listing of key application identifiers 149 represents a listing of key applications 125 that may be required to be installed, enabled and/or executing on a client device 106 in order to "unlock" access to certain resources 139. A key application 125 may be, for instance, a malware detection application, an anti-virus application, a mobile device management application and/or any other application that may be determined by a service provider or system administrator responsible for the security of the resources 139 to be required for authorizing another application (i.e., client side application 123) to access certain resources 139. As another example, a key application 125 may be an application program configured to detect whether a malware application, an anti-virus application and/or other application is installed on, enabled and/or executed by the client device 106. A key application 125 may be a specific application program or a type or category of application program.

Accordingly, the authorization service 136 may receive from a client device 106 a request 153 to access certain resources 139. In some embodiments, the request 153 may include or be sent along with user credentials 127, a device identifier 128 and/or an indication of the requested resource(s) 139. In some embodiments, the authorization service 136 may request some or all of such information from the client device 106 in response to receiving the access request 153. The authorization service 136 authenticates the user credentials 127 and/or the device identifier 128, as described.

As discussed, the authorization service 136 may also require the client device 106 to comply with certain distribution rules 145 before it authorizes the client device 106 to access the requested resource(s) 139. The information required for the compliance check may be included, for example, in the device profile 119 or otherwise stored in the data store 113 of the client device 106. In some cases, the information required for this compliance check may be provided by the client device 106 to the authorization service 136 as part of or along with the access request 153. In some cases, the authorization service 136 may request such information from the client device 106 when requesting user credentials 127 and/or the device identifier 128 or in response to authenticating the user credentials 127 and/or the device identifier 128.

In some embodiments, one or more distribution rules 145 or key application identifiers 149 may be provided to the client device 106 so that an application program (e.g., the client side application 123) or other process executed by the client device 106 may perform the compliance check. In these embodiments, the requested resource(s) 139 may not be provided to or otherwise made accessible to the client device 106 until the authorization service 136 receives a notice from the client device 106 confirming compliance. In other cases, the requested resource(s) 139 may be provided to or accessed by the client device 106 before the compliance check is performed (e.g., the applicable distribution rule(s) 145 or key application identifier(s) 149 may be provided contemporaneously with the requested resource(s) 139), but the client side application 123 or other process executed by the client device 106 may not be authorized to access or use the resource(s) 139 until compliance with the distribution rule(s) 145 is confirmed (which may or may not require transmitting a notice of confirmation to the authorization service 136).

A distribution rule 145 associated with at least one requested resource 139 may specify that a key application 125 (which may be identified by a key application identifier 149) must be installed, enabled and/or executing on the client device 106 before the client side application 123 or another process program executed by the client device 106 will be authorized to access such resource(s) 139. As per the above discussion, in some embodiments, distribution service 136 receives from the client device 106 information to confirm that the specified key application 125 is installed, enabled and/or executing (as applicable) on the client device 106. In some embodiments, the client side application 123 or another process executed by the client device 106 may be configured for receiving the distribution rule 145 or key application identifier 149 and determining whether the specified key application 125 is installed, enabled and/or executing (as applicable) on the client device 106. For example, the client side application 123 or other process may interrogate the listing of application programs 126 installed, enabled and/or executing on the client device 106, based on the key application identifier 149, to determine compliance with the distribution rule 145.

If the client device 106 is in compliance with the distribution rule 145, the authorization service 136 may instruct the distribution service 137 to provide the resource(s) 139 or provide access to the resource(s) 139 to the client side application 123. For example, the authorization service 136 may pass an authorization credential to the distribution service 127 on behalf of the client side application 123. The distribution service 127 may then provide the client side application 123 with access to the resource(s) 139 in response to authenticating the authorization credential.

In some embodiments the client side application 123 may receive from the key application 125 an authorization credential that provides access to the distribution service 137 or the requested resource(s) 139. By way of example, a resource 139 may be a secure file (e.g., encrypted, password protected, etc.) stored locally on the client device 106 and the required authorization credential (e.g., key, password, PIN, certificate, and/or token, etc.) may be provided by the key application 125. In such embodiments, the key application 125 may need to be preconfigured to store or generate such an authorization credential and to provide it to the client side application 123. In some embodiments, the client side application 123 may generate the required authorization credential based on certain code or parameters of or associated with the key application 125.

Figure 2:
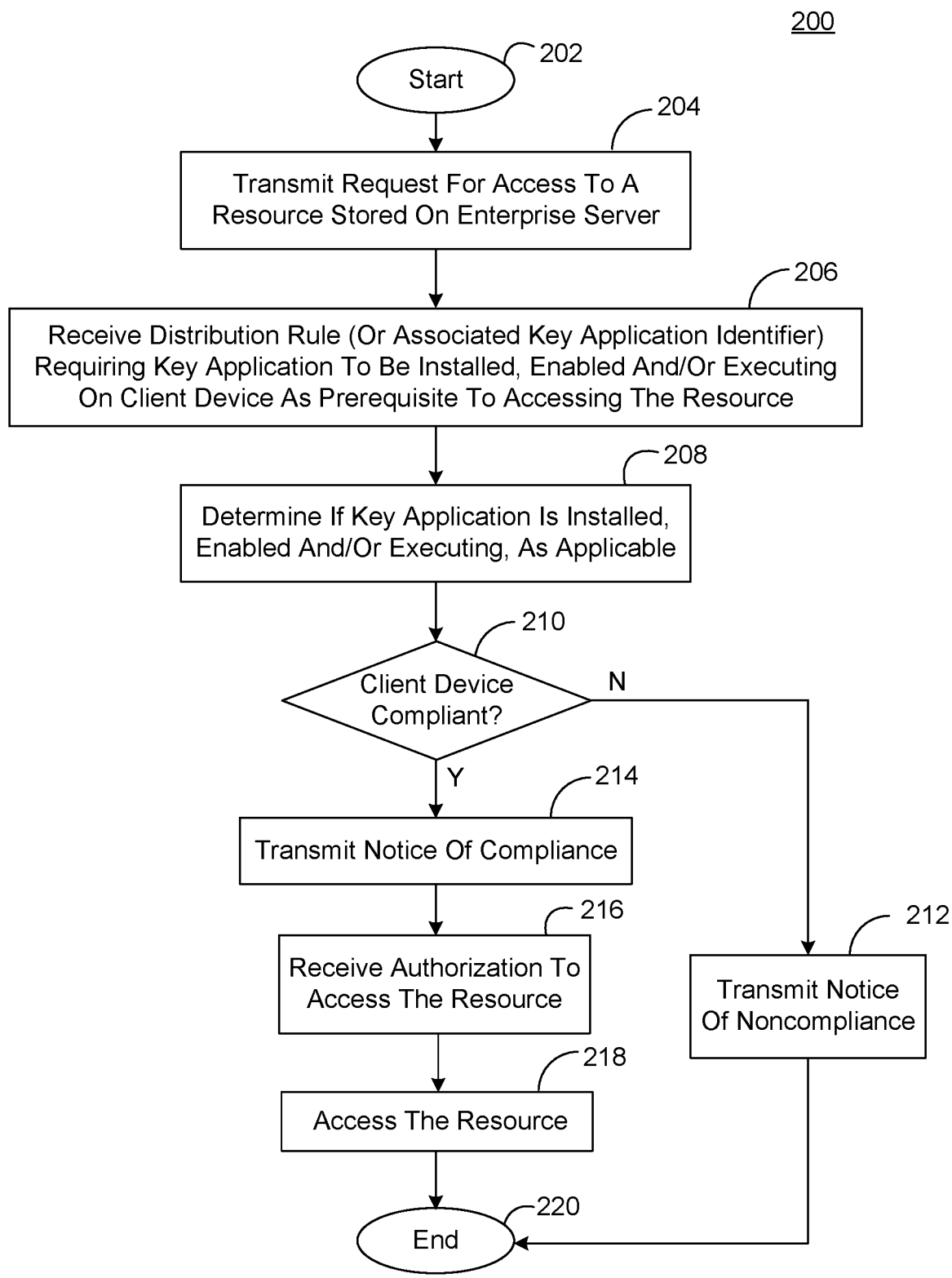
FIG. 2 is a flowchart illustrating an example of a method performed by a client side application attempting to access a resource stored on an enterprise server.

FIG. 2 is a flowchart illustrating an example of a method performed by a client side application 123 attempting to access a resource 139 stored on an enterprise server 103. The method begins at start step 202, where the client side application 123 is executed and determines (e.g., in response to a user input command or other run-time requirement) that it requires access to one or more resources 139 stored on the enterprise server 103. At step 204, the client side application 123 transmits a request 153 to the enterprise server 103 (or directly to the authorization service 139, for example, in cases where its port is known to the client side application 123 or other process executed by the client device 106) for access to the required resource(s) 139. The request may include user credentials 127, a device identifier 128 and/or an indication of the resource(s) 139 to which access is requested.

Provided that the user and/or the client device 106 have been authenticated by the authorization service 136, the method moves to step 206, where the client side application 123 receives a distribution rule 145 (or the key application identifier 149 associated therewith), requiring confirmation that one or more key application 125 is installed, enabled and/or the executing on the client device 106. As an alternative, the client side application 123 may receive in step 206 a request for information that will allow the authorization service 136 to confirm compliance with the distribution rule 145. In some embodiments, the client side application 123 may also receive the requested resource(s) 139 (but not authorization to access them) at step 206.

Next, in step 208, the client side application 123 determines whether the specified key application 125 is installed, enabled and/or the executing (as applicable, per the distribution rule 145) on the client device 106. For example, the client side application 123 may interrogate the list of applications 126 installed, enabled and/or executing on the client device 106 based on a specified key application identifier 149. If it is determined in step 210 that the client device 106 is not in compliance with the distribution rule 145, the method moves to step 212 where a notice of noncompliance may be transmitted to the authorization service 136 and/or may be displayed on the display 116 for the user. From step 212, the method ends at step 220.

However, if it is determined in step 210 that the client device 106 is in compliance with the distribution rule 145, the method proceeds to step 214 where a notice of compliance may be transmitted to the authorization service 136 and/or may be displayed on the display 116 for the user. Then in step 216, the client side application 123 may receive authorization to access the requested resource(s) 139. Again, this authorization may be in the form of an authorization credential provided by the authorization service 136 to the client side application 123 or provided by the authorization service 136 to a distribution service 137 on behalf of the client side application 123. In other examples, the authorization may be in the form of an authorization credential provided by or derived from the key application 125.

In still other examples, the presence of the key application 125 (and/or whether it is enabled and/or executing, as may be specified by the distribution rule 145) may be all that is required for the client side application 123 to be authorized to access the requested resource(s) 139. In such cases, the client side application 123 may not send a notice of compliance to the authorization service 136 in step 214 and may not need to receive any further authorization in step 216. Following step 216, the requested resource(s) 139 is/are accessed in step 218. Such access may involve receiving and accessing resources from the distribution service 137 or accessing resources from the local data store 113 that were previously received from the distribution service. From step 218, the method ends at step 220.

In some embodiments, the state of the client device 106 may be modified after the client side application 123 is authorized to access certain resources 139. For example, the user of the client device 106 may uninstall, disable or stop execution of the applicable key application 125, in contravention of the applicable distribution rule 145. As another example, an unauthenticated user may log-on to the client device 106. Accordingly, in some embodiments, the authorization service 136 and the client side application 123 may periodically communicate in order to reconfirm authentication of the user and/or client device 106 and/or compliance with the applicable distribution rule 145. These subsequent authentications and/or compliance checks may be performed as described above (e.g., by the client side application 123 and/or the authentication service 136) and, in some embodiments, may be run as background processes so as to not require further input from the user. In some embodiments, reconfirmation of authentication and compliance with the applicable distribution rule 145 may be required when the client side application 123 makes a subsequent request for access to resource(s) 139 that have already been transferred to the client device 106 or when a different application program running on the client device 106 requests access to those or other resources 139. In some embodiments, any resource(s) 139 stored on the client device 106 may be deleted (e.g., by a function of the client side application 123) if the client device 106 is determined at any time to be noncompliant with the applicable distribution rule(s) 145.

Figure 3:
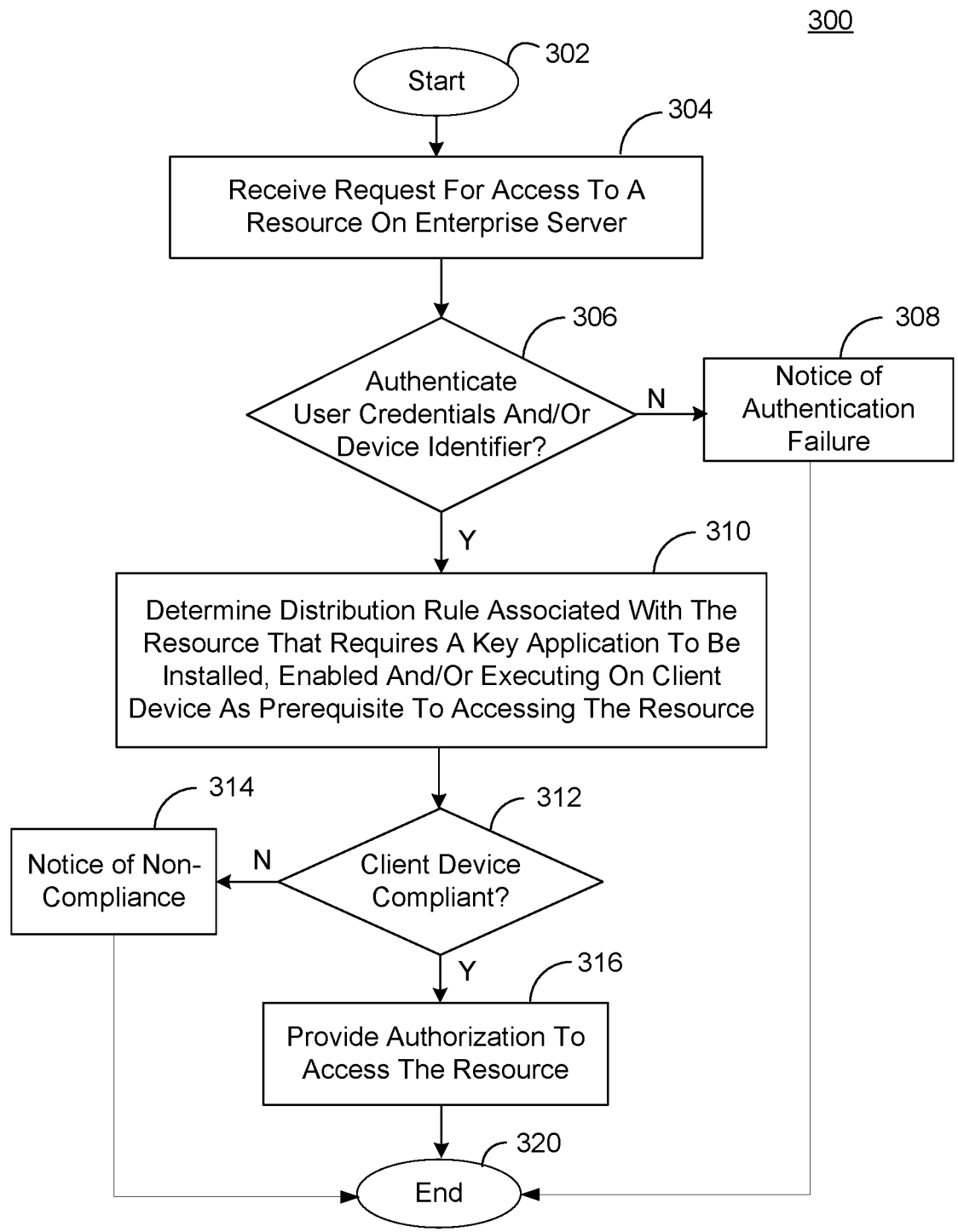
FIG. 3 is a flowchart illustrating an example of a method performed by an authorization service for authorizing or denying access to resources.

FIG. 3 is a flowchart illustrating an example of a method performed by an authorization service 136 for authorizing or denying access to resources 139 stored on an enterprise server 103. From start step 302 the method moves to step 304, where the authorization service 136 receives a request 153 from a client side application 123 to access certain resource(s) 139 hosted by the enterprise server 103. As described, user credentials 127, a device identifier 128 and/or an indication of the requested resource(s) 139 may be included in or sent contemporaneously with the access request 153. Alternatively, the authorization service 136 may request some or all of that information in response to receiving the access request 153.

Next, in step 306, the authorization service 136 determines whether the user credentials 127 and/or the device identifier 128 is/are authenticated. As described, this authentication step may involve not only determining that the user credentials 127 and/or the device identifier 128 is/are valid, but also determining if the user credentials 127 and/or the device identifier 128 is/are associated with the requested resource(s) 139. If not, the method moves to step 308 where a notification of authentication failure is transmitted to the client side application 123 and then the method ends at step 320. However, if the user credentials 127 and/or the device identifier 128 is/are authenticated in step 306, the method proceeds to step 310, where at least one distribution rule 145 associated with the requested resource(s) 139 is identified and such distribution rule(s) 145 require(s) at least one key application 125 to be installed, enabled and/or executing on the client device 106 as a prerequisite to accessing the requested resource(s) 139.

Next in step 312, a determination is made as to whether the client device 106 is in compliance with the distribution rule(s) 145. The authorization service 136 may request (or may have already received) information from the client side application 123 or other process executed by the client device 106 for enabling the authorization service 136 to perform the compliance check. Alternatively, the authorization service 136 may transmit the distribution rule(s) 145 or key application identifier(s) 149 to the client side application 123 or other process executed on the client device 106 so that the compliance check can be performed locally on the client device 106. In such cases, the authorization service 136 will await a compliance confirmation notice from the client side application 123 or other process executed on the client device 106.

If it is determined in step 312 that the client device 106 is not in compliance with the distribution rule(s) 145, a notice of noncompliance may be sent at step 314 to the client side application 123 or other process executed on the client device 106 (which may display the notice on the display 116 for the user) and, from there, the method ends at step 320. However, if it is determined in step 312 that the client device 106 is in compliance with the distribution rule(s) 145, the method advances to step 316 where authorization to access the requested resource(s) 139 is provided. In some cases the authorization in step 316 may be implicit, meaning that the client side application 123 is authorized to access the requested resource(s) 139 if it is in compliance with the distribution rule(s) 145, and no further message or command needs to be sent by the authorization service 136.

In some embodiments, provision of such authorization may involve the authorization service 136 sending to the client side application 123 an authorization credential that will provide access to the distribution service 137, which will deliver or allow access to the requested resource(s) 139. In some embodiments, the authorization service 136 may send such an authorization credential to the distribution service 137 on behalf of the client side application 123. In some embodiments, the authorization service 136 may issue a command to the client side application 123 to obtain or derive an authorization credential from the key application(s) 125. In some embodiments, the client side application 123 is configured to automatically obtain or derive the authorization credential from the key application(s) 125 in response to determining compliance with the distribution rule(s) 145 and, thus, step 316 may not be necessary. Following step 316, the method ends at step 320.

Figure 4:
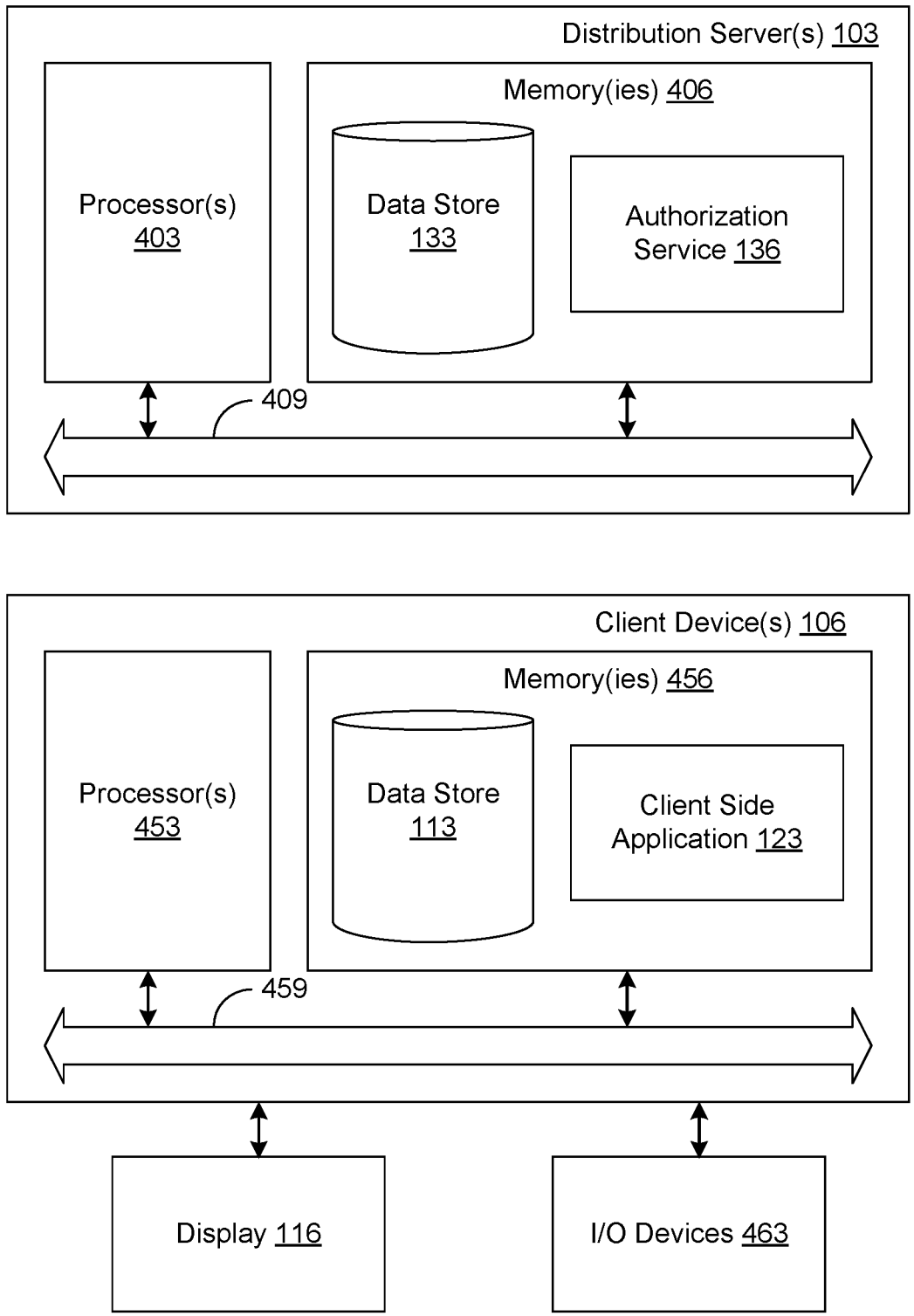
FIG. 4 shows schematic block diagrams illustrating certain components of an enterprise server and a client device employed in the networked environment of FIG. 1.

FIG. 4 shows schematic block diagrams illustrating certain components of an enterprise server 103 and a client device 106 employed in the networked environment of FIG. 1. The enterprise server 103 includes at least one processor circuit, for example, having a processor 403 and a memory 406, both of which are coupled to a local interface 409. To this end, the enterprise server 103 may comprise, for example, at least one server computer or like device. Similarly, the client device 106 includes at least one processor circuit, for example, having a processor 453 and a memory 456, both of which are coupled to a local interface 459. Additionally, the client device 106 may be in data communication with a display 116 for rendering user interfaces 129 (FIG. 1) and one or more other I/O devices 463 for inputting and outputting data. To this end, the client device 106 may comprise, for example, at least one client computer or like device.

The following is a general discussion of the components of the enterprise server 103 and the client device 106. The local interface 409 and 459 may comprise, for example, a data bus with an accompanying address/control bus or other bus structure as can be appreciated. Stored in the memory 406 and 456 are both data and several components that are executable by the processors 403 and 453. In particular, with regard to the enterprise server 103, stored in the memory 406 and executable by the processor 403 are an authorization service 136 and potentially other applications. Additionally, with regard to the client device 106, stored in the memory 456 and executable by the processor 453 are a client side application 123, key application 125 and potentially other applications. Also stored in the memory 406 and 456 may be a data store 133 and 113 and other data. In addition, an operating system may be stored in the memory 406 and 456 and executable by the processor 403 and 453.

It is to be understood that there may be other applications that are stored in the memory 406 and 456 and are executable by the processor 403 and 453 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and 456 and are executable by the processor 403 and 453. In this respect, the term "executable" means a program file that is in a form that can ultimately be run by the processor 403 and 453. Examples of executable programs may be, for example, a compiled program that can be translated into machine code in a format that can be loaded into a random access portion of the memory 406 and 456 and run by the processor 403 and 453, source code that may be expressed in proper format such as object code that is capable of being loaded into a random access portion of the memory 406 and 456 and executed by the processor 403 and 453, or source code that may be interpreted by another executable program to generate instructions in a random access portion of the memory 406 and 456 to be executed by the processor 403 and 453, etc. An executable program may be stored in any portion or component of the memory 406 and 456 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 and 456 are defined herein as including both volatile and nonvolatile memory and data storage components. Volatile components are those that do not retain data values upon loss of power. Nonvolatile components are those that retain data upon a loss of power. Thus, the memory 406 and 456 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 and 453 may represent multiple processors, and the memory 406 and 456 may represent multiple memories that operate in parallel processing circuits, respectively. In such a case, the local interface 409 and 459 may be an appropriate network 109 (FIG. 1) that facilitates communication between any two of the multiple processors 403 and 453, or between any two of the memories 406 and 456, etc. The local interface 409 and 459 may comprise additional systems designed to coordinate this communication, including, for example, performing load balancing. The processor 403 and 453 may be of electrical or of some other available construction.

Although the authorization service 136, distribution service 137, client side application 123, key application 125 and other various processes and functionality described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

It is to be understood that the flowcharts of FIG. 2 and FIG. 3 provide merely examples of the many different types of functional arrangements that may be employed to implement the operation of the client side application 123 and authorization service 136, respectively, as described herein. The flowcharts may also be viewed as depicting example of methods implemented in the client device 106 and the enterprise server 103 (or other network device), respectively, according to one or more embodiments. If embodied in software, each method step or box of the flowcharts may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 and 453 in a computer system or other system. The machine code may be converted from the source code, etc. If embodied in hardware, each block may represent a circuit or a number of interconnected circuits to implement the specified logical function(s).

Although the flowcharts of FIG. 2 and FIG. 3 show a specific order of execution, it is understood that the order of execution may differ from that which is depicted. For example, the order of execution of two or more steps may be scrambled relative to the order shown. Also, two or more blocks shown in succession in FIG. 2 or FIG. 3 may be executed concurrently or with partial concurrence. Further, in some embodiments, one or more of the steps shown in FIG. 2 or FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authorization service 136, distribution service 137, client side application 123, and key application 125, that comprises software or code can be embodied in any non-transitory computer-readable medium for use by or in connection with an instruction execution system such as, for example, a processor 403 and 453 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described and other possible embodiment(s) without departing substantially from the spirit and principles of the disclosure. All such modifications and variations are intended to be included within the scope of this disclosure and the following claims.

Therefore, the following is claimed:

1. A method comprising:
obtaining, on a client device, a distribution rule requiring a key application configured to generate a credential for an application to access a resource on the client device;
determining, on the client device, a compliance with the distribution rule based on interrogating a listing of application programs on the client device to determine a presence of the key application;
initiating, on the client device, authentication of the client device with an authorization service, the authentication based upon at least one of a user credential or a device identifier;
in response to authenticating the client device with the authorization service, obtaining, from the key application, the credential associated with the resource; and
in response to a request from the application executed by the client device to access the resource, providing the credential to the application, wherein the credential enables the application to access the resource.

2. The method of claim 1, wherein the resource is a file that is stored on the client device and the credential enables the application to access the resource.

3. The method of claim 1, wherein the resource is a remote resource and the credential authenticates the application to the remote resource.

4. The method of claim 3, wherein the credential comprises an authentication token that is different from the user credential.

5. The method of claim 1, wherein providing the credential to the application comprises enabling a previously disabled function of the application for accessing the resource.

6. The method of claim 1, wherein authentication of the client device is further based upon the compliance.

7. The method of claim 6, wherein the distribution rule further requires that a particular application be installed on the client device as a prerequisite to accessing the resource.

8. A client device comprising:
a network connectivity interface for enabling communication between the client device and an authorization service via a network;
a memory for storing an application and at least one application comprising a key application;
a processor communicatively coupled to the memory for executing the at least one application, wherein the at least one application is configured to cause the client device to at least:
obtain a distribution rule requiring the key application configured to generate a credential for the application to access a resource on the client device;
determine a compliance with the distribution rule based on interrogating a listing of application programs on the client device to determine a presence of the key application;
initiate authentication of the client device with the authorization service, the authentication based upon at least one of a user credential or a device identifier;
in response to authenticating the client device with the authorization service, obtain, from the key application, the credential associated with the resource; and
in response to a request from the application executed by the client device to access the resource, provide the credential to the application, wherein the credential enables the application to access the resource.

9. The client device of claim 8, wherein the resource is a file that is stored on the client device and the credential enables the application to access the resource.

10. The client device of claim 9, wherein the credential comprises an authentication token that is different from the user credential.

11. The client device of claim 8, wherein the resource is a remote resource and the credential authenticates the application to the remote resource.

12. The client device of claim 8, wherein the credential is provided to the application by enabling a previously disabled function of the application for accessing the resource.

13. The client device of claim 8, wherein authentication of the client device is further based upon the compliance.

14. The client device of claim 13, wherein the distribution rule further requires that a particular application be installed on the client device as a prerequisite to accessing the resource.

15. A non-transitory computer-readable medium embodying a program executable in a client device, the program, when executed, causing the client device to at least:
obtain a distribution rule requiring a key application configured to generate a credential for an application to access a resource on the client device;
determine a compliance with the distribution rule based on interrogating a listing of application programs on the client device to determine a presence of the key application;
initiate authentication of the client device with an authorization service, the authentication based upon at least one of a user credential or a device identifier;
in response to authenticating the client device with the authorization service, obtain, from the key application, the credential associated with the resource; and
in response to a request from the application executed by the client device to access the resource, provide the credential to the application, wherein the credential enables the application to access the resource.

16. The non-transitory computer-readable medium of claim 15, wherein the resource is a file that is stored on the client device and the credential enables the application to access the resource.

17. The non-transitory computer-readable medium of claim 15, wherein the resource is a remote resource and the credential authenticates the application to the remote resource.

18. The non-transitory computer-readable medium of claim 17, wherein the credential comprises an authentication token that is different from the user credential.

19. The non-transitory computer-readable medium of claim 15, wherein the credential is provided to the application by enabling a previously disabled function of the application for accessing the resource.

20. The non-transitory computer-readable medium of claim 15, wherein authentication of the client device is further based upon the compliance.

\* \* \* \* \*